United States Patent
Chung (10) Patent No.: US 12,492,680 B2
(45) Date of Patent: Dec. 9, 2025

(54) VERTIPORT INCLUDING WIND POWER GENERATION SYSTEM

(71) Applicants: Hyundai Motor Company, Seoul (KR); Kia Corporation, Seoul (KR)

(72) Inventor: Jae Hoon Chung, Seoul (KR)

(73) Assignees: Hyundai Motor Company, South (KR); Kia Corporation, South (KR)

( * ) Notice: Subject to any disclaimer, the term of this patent is extended or adjusted under 35 U.S.C. 154(b) by 0 days.

(21) Appl. No.: 18/641,664

(22) Filed: Apr. 22, 2024

(65) Prior Publication Data
US 2025/0198384 A1 Jun. 19, 2025

(30) Foreign Application Priority Data
Dec. 18, 2023 (KR) .................. 10-2023-0184767

(51) Int. Cl.
*F03D 9/43* (2016.01)
*E01F 3/00* (2006.01)

(52) U.S. Cl.
CPC .................. *F03D 9/43* (2016.05); *E01F 3/00* (2013.01); *F05B 2240/9113* (2013.01); *F05B 2260/503* (2013.01)

(58) Field of Classification Search
CPC ........................ F03D 9/43; F05B 2240/9113
See application file for complete search history.

(56) References Cited

U.S. PATENT DOCUMENTS

| | | | |
|---|---|---|---|
| 3,041,012 A * | 6/1962 | Jesse | B64C 39/001 416/129 |
| 5,998,882 A * | 12/1999 | Alston | F03D 9/22 60/226.1 |
| 6,749,393 B2 * | 6/2004 | Sosonkina | F03D 3/02 415/4.4 |
| 7,380,751 B1 * | 6/2008 | Henson | F03D 9/12 244/1 R |
| 9,046,076 B1 * | 6/2015 | Al Salameh | F03D 9/25 |
| 9,359,997 B2 * | 6/2016 | Toh | F03D 9/00 |
| 10,046,863 B2 | 8/2018 | Ying | |
| 10,938,275 B2 * | 3/2021 | Glatfelter | F03D 3/002 |
| 11,328,611 B2 | 5/2022 | Shannon | |
| 12,391,404 B2 * | 8/2025 | Chung | F03D 9/43 |

(Continued)

FOREIGN PATENT DOCUMENTS

| JP | 2014173552 A | 9/2014 |
|---|---|---|
| JP | 2018100088 A | 6/2018 |

(Continued)

*Primary Examiner* — Pedro J Cuevas
(74) *Attorney, Agent, or Firm* — Slater Matsil, LLP (57) ABSTRACT

An embodiment vertiport includes a body portion, a take-off and landing portion disposed in the body portion and spaced apart from the body portion by a predetermined gap, a door portion disposed in the gap between the take-off and landing portion and the body portion and configured to be opened and closed, an elevation portion disposed in the body portion and configured to be raised and lowered with respect to the body portion, and a power generating unit slidably coupled to the elevation portion, wherein the power generating unit is configured to produce electrical energy using a downdraft generated by a take-off and landing operation of an aircraft on the take-off and landing portion.

20 Claims, 5 Drawing Sheets

(56) References Cited

U.S. PATENT DOCUMENTS

| | | | |
|---|---|---|---|
| 2003/0035725 A1* | 2/2003 | Sosonkina | F03D 3/0472 |
| | | | 415/4.1 |
| 2009/0250936 A1* | 10/2009 | Souryal | F03D 9/255 |
| | | | 290/55 |
| 2011/0129334 A1* | 6/2011 | Wu | B63B 35/4413 |
| | | | 415/126 |
| 2017/0234291 A1* | 8/2017 | Noia | C02F 1/58 |
| | | | 290/53 |
| 2018/0226860 A1* | 8/2018 | Glatfelter | H02K 7/1823 |
| 2019/0055914 A1* | 2/2019 | Noia | B63B 35/44 |
| 2019/0280563 A1* | 9/2019 | Glatfelter | F03D 9/43 |
| 2020/0193847 A1* | 6/2020 | Shannon | G08G 5/55 |
| 2025/0214715 A1* | 7/2025 | Chung | B64F 1/22 |

FOREIGN PATENT DOCUMENTS

| | | | | |
|---|---|---|---|---|
| KR | 101604174 B1 | 3/2016 | | |
| KR | 101853340 B1 | 6/2018 | | |
| KR | 20230117998 A | 8/2023 | | |
| WO | 2011087541 A2 | 7/2011 | | |
| WO | 2012089726 A1 | 7/2012 | | |
| WO | WO-2015142363 A1 * | 9/2015 | | F03D 1/00 |

* cited by examiner

VERTIPORT INCLUDING WIND POWER GENERATION SYSTEM

CROSS-REFERENCE TO RELATED APPLICATIONS

This application claims the benefit of Korean Patent Application No. 10-2023-0184767, filed on Dec. 18, 2023, which application is hereby incorporated herein by reference in its entirety.

TECHNICAL FIELD

The present disclosure relates to a vertiport including a wind power generation system.

BACKGROUND

Recently, the urban air mobility (UAM) for future transportation and traffic systems has been under development. The UAM is an aircraft capable of vertical take-off and landing. Along with the development of the UAM, the development of a vertiport, in which the UAM may take-off and land, is required.

Vertiports include infrastructure or systems with support services and equipment for landing, ground handling, and take-off of manned or unmanned vertical take-off and landing (VTOL) aircraft. Vertiports are generally considered to be installed on the rooftops of high-rise buildings or in large parks. A vertiport may have a smaller footprint with smaller landing and take-off regions compared to a typical airport with typical runways.

VTOL aircraft may generate a downdraft during take-off and landing at the vertiport. Meanwhile, a vertiport requires power for lighting and system power or for charging aircraft, and energy efficiency may be increased by producing electrical energy through wind power using the downdraft generated during the landing process of the aircraft.

SUMMARY

The present disclosure relates to a vertiport including a wind power generation system. Particular embodiments relate to a vertiport including a wind power generating unit capable of producing electricity using a downdraft generated during take-off and landing of an aircraft.

An embodiment of the present disclosure provides a vertiport including a wind power generating unit that may produce electricity using a downdraft generated during take-off and landing of an aircraft.

According to an embodiment of the present disclosure, a vertiport includes a body portion, a take-off and landing portion provided in the body portion and spaced apart from the body portion by a predetermined gap, a door portion disposed in the gap between the take-off and landing portion and the body portion and configured to be opened and closed, an elevation portion provided in the body portion, at least a portion of which is raised and lowered with respect to the body portion, and a power generating unit slidably coupled to at least a portion of the elevation portion, wherein the power generating unit is provided to produce electrical energy using a downdraft generated while the aircraft takes off and lands on the take-off and landing portion.

The vertiport may be switched between a default mode in which the door portion is closed, the elevation portion is lowered, and the power generating unit is located below the body portion and a power generation mode in which the door portion is opened, the elevation portion is raised, and the power generating unit is exposed between the body portion and the take-off and landing portion.

The power generating unit may produce electrical energy based on take-off and landing operations of the aircraft in the power generation mode.

The elevation portion may include a rail portion to which the power generating unit is slidably connected and a guide portion guiding a vertical movement of the rail portion.

The rail portion and the guide portion may include a connection structure of a rack and a pinion gear.

The rail portion may include a rail that guides sliding of the power generating unit, and the power generating unit slides at least a section of the rail portion along the rail.

The power generating unit may be provided in plural, and the rail portion may be divided into movement sections corresponding to the number of the plurality of power generating units.

The rail portion may be formed in a circular shape, and each of the movement sections for each of the plurality of power generating units may have an angle range obtained by dividing 360 degrees by the number of power generating units.

The power generating unit may include a wind turbine.

The vertiport may further include a controller controlling an opening and closing operation of the door portion, an elevation operation of the rail portion, and a sliding operation of the power generating unit.

The controller may be configured to determine an operating position of the power generating unit based on aircraft information and status information of the aircraft landing on the take-off and landing portion and move the power generating unit to the operating position.

The aircraft information may include a model of the aircraft and a rotor position according to the model, and the status information may include a landing position of the aircraft with respect to the take-off and landing portion and a landing direction of the aircraft.

The operating position may be a position in which the power generating unit produces electrical energy with maximum efficiency.

The controller may be configured to calculate a relative position of the rotor with respect to the take-off and landing portion or the rail portion based on the landing position, the landing direction, and the rotor position and calculate and determine the operating position to correspond to the calculated relative position of the rotor.

The electrical energy produced by the power generating unit may be used to charge the aircraft.

According to another embodiment of the present disclosure, an aircraft landing method includes an operation in which the aircraft approaches a vertiport equipped with a power generating unit, an operation in which a door portion provided in the vertiport is opened and the power generating unit is raised, an operation in which the aircraft descends and electrical energy is produced by the power generating unit, an operation in which the aircraft lands on and reaches a take-off and landing portion of the vertiport, and an operation in which the power generating unit is lowered and the door portion is closed, wherein the power generating unit is provided to produce electrical energy using a downdraft generated during the landing of the aircraft.

The operation in which the aircraft approaches the vertiport may include an operation in which an operating position of the power generating unit is determined based on aircraft information and status information of the aircraft and an operation in which the power generating unit moves to the operating position.

The aircraft information may include a model of the aircraft and a rotor position according to the model, the status information may include a landing position of the aircraft with respect to the take-off and landing portion and a landing direction of the aircraft, and the operating position may be a position in which the power generating unit produces electrical energy with maximum efficiency.

In the operation in which the operating position of the power generating unit is determined, a relative position of the rotor with respect to the take-off and landing portion may be calculated based on the landing position, the landing direction, and the rotor position, and the operating position may be calculated and determined to correspond to the calculated relative position of the rotor.

BRIEF DESCRIPTION OF THE DRAWINGS

The above and other aspects, features, and advantages of embodiments of the present disclosure will be more clearly understood from the following detailed description, taken in conjunction with the accompanying drawings, in which.

DETAILED DESCRIPTION OF ILLUSTRATIVE EMBODIMENTS

While the present disclosure may be modified in various ways and take on various alternative forms, specific embodiments thereof are illustrated in the drawings and described in detail below. However, it should be understood that there is no intent to limit the present disclosure to the particular forms disclosed, but on the contrary, the present disclosure covers all modifications, equivalents, and alternatives falling within the spirit and scope of the present disclosure.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present disclosure. As used herein, the term "and/or" includes any and all combinations of one or more of the associated listed items.

The terminology used herein to describe embodiments of the present disclosure is not intended to limit the scope of the present disclosure. The articles "a" and "an" are singular in that they have a single referent, however the use of the singular form in the present document should not preclude the presence of more than one referent. In other words, elements of the present disclosure referred to in the singular may number one or more, unless the context clearly indicates otherwise. It will be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless defined in a different way, all the terms used herein including technical and scientific terms have the same meanings as understood by those skilled in the art to which the present disclosure pertains. Such terms as defined in generally used dictionaries should be construed to have the same meanings as those of the contexts of the related art, and unless clearly defined in the application, they should not be construed to have ideally or excessively formal meanings.

The present disclosure may be modified in various ways and may have various embodiments.

In this specification, an aircraft may refer to a mobility vehicle that may move by flying in the sky. That is, in addition to referring to helicopters, drones, tilt rotors, fixed-wing airplanes, etc., aircraft may also include vehicles that move on the ground using wheels and the like and may fly with the wheels, etc. separated from the ground. In addition, aircraft may include manned aircraft and unmanned aircraft. Manned aircraft may include aircraft that may operate autonomously in addition to aircraft controlled by a pilot.

Hereinafter, embodiments of the present disclosure will be described with reference to the drawings.

Figure 1:
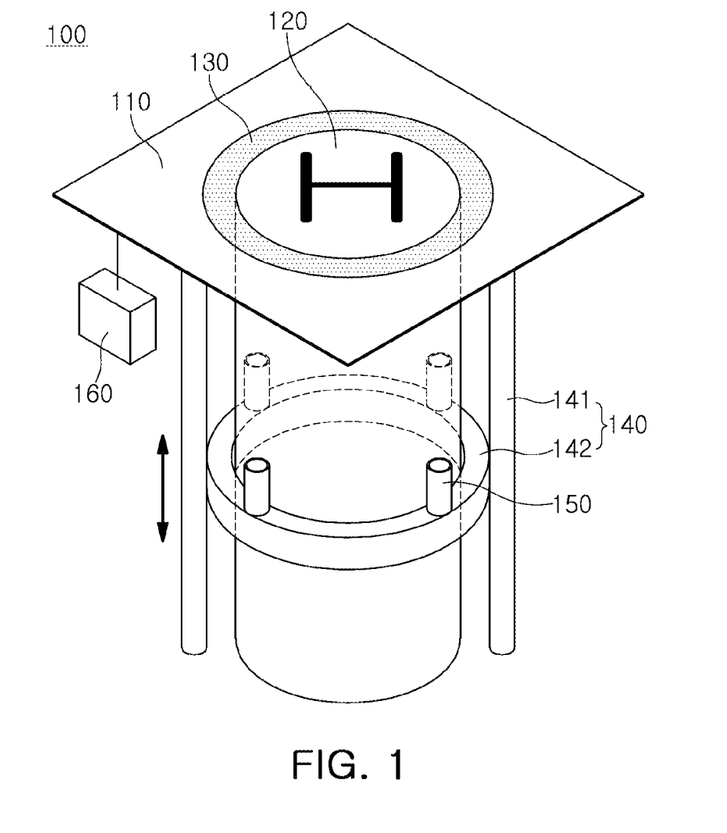
FIG. 1 illustrates a default mode of a vertiport according to an embodiment of the present disclosure.
Figure 2:
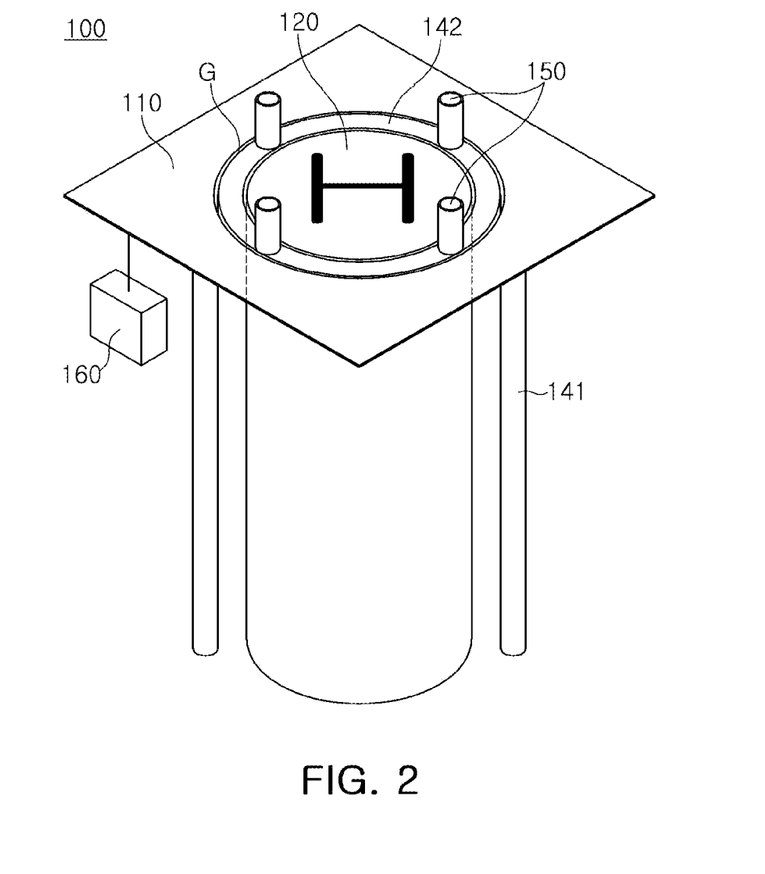
FIG. 2 illustrates a power generation mode of a vertiport according to an embodiment of the present disclosure.

FIG. 1 illustrates a default mode of a vertiport 100 according to an embodiment of the present disclosure. FIG. 2 illustrates a power generation mode of the vertiport 100 according to an embodiment of the present disclosure.

FIGS. 1 and 2 are diagrams schematically illustrating the vertiport 100 according to an embodiment.

FIG. 1 illustrates a vertiport 100 in a default mode in which a power generating unit 150 is located inside a body portion 110 before an elevation portion 140 is raised, and FIG. 2 illustrates the vertiport 100 in a power generation mode in which the power generating unit 150 is located outside the body portion 110 after the elevation portion 140 is raised.

The vertiport 100 according to an embodiment of the present disclosure is an airfield or pad (e.g., a take-off and landing field) of an aircraft (e.g., see aircraft 200 in FIGS. 5 and 6) capable of vertical take-off and landing (VTOL), which may include infrastructure to receive aircraft from a flight, reset aircraft for subsequent flights, and allow aircraft to depart for subsequent flights. Here, the aircraft 200 may be an air mobility including an urban air mobility (UAM) and an advanced air mobility (AAM), and the type of aircraft 200 is not particularly limited.

The vertiport 100 refers to ground infrastructure for take-off and landing, charging, or maintenance of vertical take-off and landing aircraft, and may be understood as including all of a verti-hub, a vertiport, and a verti-stop classified according to sizes.

For example, a verti-hub is the largest UAM airfield, capable of large-scale transfer of surrounding traffic, such as airports, and has support infrastructure, such as charging and maintenance, and allows a large number of UAM aircraft to be parked after the end of operations. A vertiport is a smaller take-off and landing pad than a verti-hub, has aircraft support infrastructure (charging, maintenance, etc.), and may also provide passenger convenience facilities. A verti-stop (or verti-station) is smaller than a vertiport and is a small take-off and landing pad with one or two aircraft stands.

Referring to FIGS. 1 and 2, the vertiport 100 according to an embodiment may include the body portion 110, a take-off and landing portion 120, a door portion 130, an elevation portion 140, the power generating unit 150, and a controller 160.

The body portion 110 may be provided to allow the aircraft 200 to take-off, land, stop, or move. Other components of the vertiport 100 may be provided inside and/or outside the body portion 110. For example, the take-off and landing portion 120 and the door portion 130 may be disposed outside the body portion 110, and the elevation portion 140, the power generating unit 150, and controller 160 may be located inside the body portion 110. However, the positions in which the take-off and landing portion 120, the door portion 130, the elevation portion 140, the power generating unit 150, and the controller 160 are arranged in the body portion 110 are not particularly limited.

The body portion 110 may be provided to support an opening and closing operation of the door portion 130 and an elevation operation of the elevation portion 140. For example, the body portion 110 may have a structure in which the door portion 130 is coupled to at least a portion thereof and may be opened or closed. In addition, the body portion 110 may have a structure in which the elevation portion 140 is coupled to at least a portion thereof and may be raised or lowered.

FIGS. 1 and 2 are schematic diagrams of the vertiport 100, which may be understood as illustrating a floor on which the take-off and landing portion 120 is located in the entire configuration (or entire region) of the body portion 110, and the body portion 110 is not limited to the plate shape itself illustrated in FIGS. 1 and 2. For example, the body portion 110 may be configured as a structure in which the door portion 130, the elevation portion 140, the power generating unit 150, and the controller 160 are arranged/installed.

In addition, although not illustrated in FIGS. 1 and 2, the body portion 110 may be provided with components and/or auxiliary facilities for take-off, landing, stopping, maintenance, charging, and movement of the aircraft 200.

The take-off and landing portion 120 is a portion in which the aircraft 200 takes off or lands and the aircraft 200 is seated, and it may be provided or formed in at least a partial region of the body portion 110. For example, the take-off and landing portion 120 may be referred to as a take-off and landing zone, a take-off and landing region, a take-off and landing plate, or a take-off and landing platform provided in a partial region of the body portion 110.

The take-off and landing portion 120 may be disposed to be spaced apart from the body portion 110 at a predetermined distance. For example, the take-off and landing portion 120 may be disposed in a partial region (e.g., it may be an open region) of the body portion 110, and a gap G may be formed between the take-off and landing portion 120 and the body portion 110. The gap G between the take-off and landing portion 120 and the body portion 110 may provide a space in which the door portion 130 is disposed, and when the door portion 130 is opened, the elevation portion 140 may be raised to provide a space in which the power generating unit 150 is exposed.

Meanwhile, according to the illustrated embodiment and the above description, the take-off and landing portion 120 is configured separately from the body portion 110, but this is an example, and according to various embodiments, the take-off and landing portion 120 may be integrally formed with the body portion 110 and may be provided through a partial region of the body portion 110. According to the above embodiment, the body portion 110 may be divided into a basic region and a take-off and landing region (e.g., the take-off and landing portion 120), and the gap G may be formed between the basic region and the take-off and landing region.

The door portion 130 may be provided to enable an opening and closing operation between the take-off and landing portion 120 and the body portion 110. For example, the door portion 130 may be disposed in the gap G between the take-off and landing portion 120 and the body portion 110 and may be opened or closed. The door portion 130 may be opened or closed based on a control signal from the controller 160. The door portion 130 may be implemented using an iris door mechanism, but it is not limited thereto.

FIG. 1 illustrates the door portion 130 in a closed state, and FIG. 2 illustrates the door portion 130 in an open state. When the door portion 130 is closed, the gap G between the take-off and landing portion 120 and the body portion 110 is covered by the door portion 130, and the space between the take-off and landing portion 120 and the body portion 110 is closed. When the door portion 130 is opened, the gap G between the take-off and landing portion 120 and the body portion 110 is exposed externally and the space between the take-off and landing portion 120 and the body portion 110 is opened.

For example, when the door portion 130 is opened, the elevation portion 140 and the power generating unit 150 may be raised to be located in the gap G between the take-off and landing portion 120 and the body portion 110 (e.g., the power generation mode in FIG. 2), and when the door portion 130 is closed, the elevation portion 140 and the power generating unit 150 may be lowered to be located below (or inside) the body portion 110 (e.g., the default mode in FIG. 1).

The elevation portion 140 may be disposed in the body portion 110 and at least a portion thereof may be configured to be raised or lowered with respect to the body portion 110. The elevation portion 140 may include a guide portion 141 and a rail portion 142 moving vertically along the guide portion 141.

The guide portion 141 may guide a vertical movement of the rail portion 142, and the rail portion 142 may be raised or lowered along the guide portion 141. The rail portion 142 may be raised or lowered along the guide portion 141 based on a control signal from the controller 160. The guide portion 141 and the rail portion 142 may be connected using a connection structure of a rack and a pinion gear, but they are not limited thereto.

The rail portion 142 may support the power generating unit 150 to be movable. The power generating unit 150 may be connected to the rail portion 142 to be movable along the rail portion 142. For example, the rail portion 142 may include a rail capable of guiding movement of the power generating unit 150, and the power generating unit 150 may move in at least a section of the rail portion 142 along the rail.

The rail portion 142 may have a shape of a circular ring. For example, the rail portion 142 may have a shape of a circular ring corresponding to the shape of the gap G to be located in the gap G between the take-off and landing portion 120 and the body portion 110. As the door portion 130 is opened in the power generation mode, the rail portion 142 may be accommodated in the gap G and may be located between the take-off and landing portion 120 and the body portion 110.

The rail portion 142 may be raised or lowered along the guide portion to move the power generating unit 150. For example, the rail portion 142 may be raised along the guide portion 141 to expose the power generating unit 150 onto the body portion 110, thereby switching the vertiport 100 from the default mode to the power generation mode, and conversely, the rail portion 142 may be lowered along the guide portion 141 to locate the power generating unit 150 below the body portion 110, thereby switching the vertiport 100 from the power generation mode to the default mode.

The power generating unit 150 may be provided to generate wind power using a downdraft generated during take-off and landing of an aircraft. For example, the power generating unit 150 may convert kinetic energy of wind caused by a downdraft into mechanical energy and produce electricity using the converted mechanical energy. The power generating unit 150 may include a wind turbine or a wind generator.

Electrical energy produced through the power generating unit 150 may be supplied to demand sources (such as lighting or system power) provided in the vertical take-off and landing portion 120 or may be used to charge an aircraft that is stationary in the vertical take-off and landing portion 120. However, the use of electrical energy is not particularly limited.

The power generating unit 150 may be movably coupled to the elevation portion 140. For example, the power generating unit 150 may be slidably coupled to the rail portion 142 of the elevation portion 140 and may move along the circular rail portion 142. The power generating unit 150 may move along the rail portion 142 based on a control signal from the controller 160. The power generating unit 150 may be moved to a position at which power generation efficiency may increase based on aircraft information and status information of the aircraft 200 landing on the vertiport 100. Here, the position at which power generation efficiency may increase may be determined by the controller 160.

The power generating unit 150 may be provided in plural. The plurality of power generating units 150 may move in some sections of the rail portion 142. For example, the sections in which the plurality of power generating units 150 moves on the circular rail portion 142 may be determined to correspond to the number of power generating units 150. The section/region allocated to each of the plurality of power generating units 150 will be described in detail below with reference to FIGS. 3 and 4.

The power generating unit 150 may be provided to continuously receive power while sliding along the rail portion 142. For example, the power generating unit 150 and the rail portion 142 may be provided so that power may be transmitted to the power generating unit 150 constantly using a sliding connector and a printed circuit board (PCB) regardless of the position of the power generating unit 150. In this case, the PCB may be provided in the rail portion 142 to correspond to a movement range of the power generating unit 150, the sliding connector connected to the PCB is provided in the power generating unit 150, and the PCB may be connected to a separate power supply unit. Accordingly, when the power generating unit 150 slides, the sliding connector may move together, while connected to the PCB, to continuously transmit power and signals to the power generating unit 150.

Although not shown, the power generating unit 150 may include a power generating device (or a turbine), a plate, on which the power generating device is fixed, moving along the rail portion 142, and a motor providing driving force for movement of the plate. The plate may move along the rail portion 142 according to driving of the motor.

The controller 160 may control the overall operation and driving of the vertiport 100. The controller 160 may be provided in the body portion 110. The controller 160 may control the opening and closing of the door portion 130, the raising and lowering of the elevation portion 140, and the movement of the power generating unit 150. For example, the controller 160 may be electrically connected to the door portion 130, the elevation portion 140, and the power generating unit 150.

The controller 160 may transmit and/or receive various information and/or signals related to take-off and landing of the aircraft from/to the aircraft and/or a control section (or a control system).

For example, the controller 160 may receive information on the aircraft about to land on the vertiport 100 from the control section and/or the aircraft and adjust the position of the power generating unit 150 based on the received aircraft information.

In addition, for example, when the position adjustment and landing preparation of the power generating unit 150 are completed, the controller 160 may transmit a landing permission signal to the aircraft and/or the control section, and upon receiving a landing completion signal from the aircraft, the controller 160 may transmit a get-off permission signal of a passenger and/or cargo to the aircraft and/or the control section in consideration of an opening/closing state of the door portion 130.

Meanwhile, the description given above in relation to information and/or signal transmission is an example, and in addition to the information described above, the controller 160 may exchange additional information and/or signals required in relation to take-off and landing of the aircraft with the aircraft and/or the control section (or the control system).

The controller 160 may include a processor and memory. Here, the processor may control the overall operation of the controller 160, and the memory may store programs for the operation of the controller 160, input/output data, and various setting information. The memory may be implemented as one or more of storage mediums, such as a flash memory, a hard disk, a secure digital (SD) card, a random access memory (RAM), a read only memory (ROM), and web storage.

For example, the memory of the controller 160 may store aircraft information (particularly, a position of the rotor for each model) of various types of aircraft taking off and landing on the vertiport 100. In addition, logic for calculating the maximum efficiency position of the power generating unit 150 in response to aircraft information and status information may be stored in the memory of the controller 160.

Figure 3:
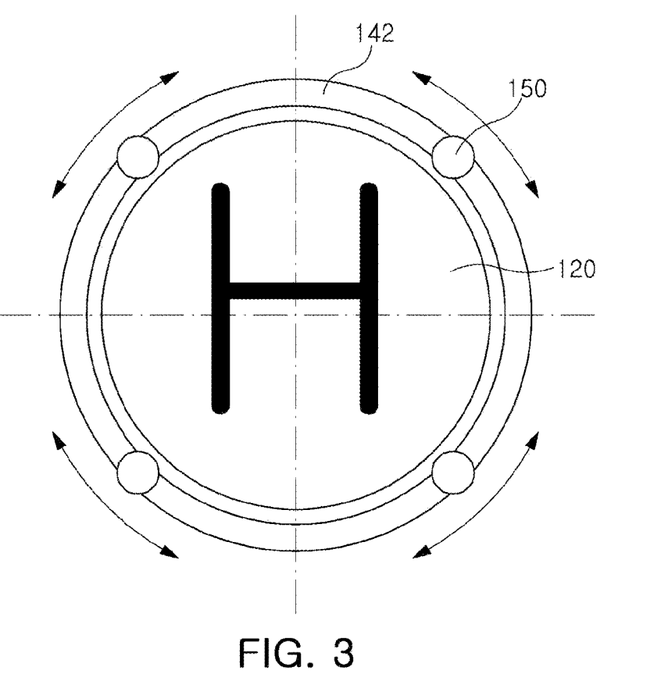
FIG. 3 illustrates a take-off and landing portion, a rail portion, and a power generating unit of a vertiport according to an embodiment of the present disclosure.
Figure 4:
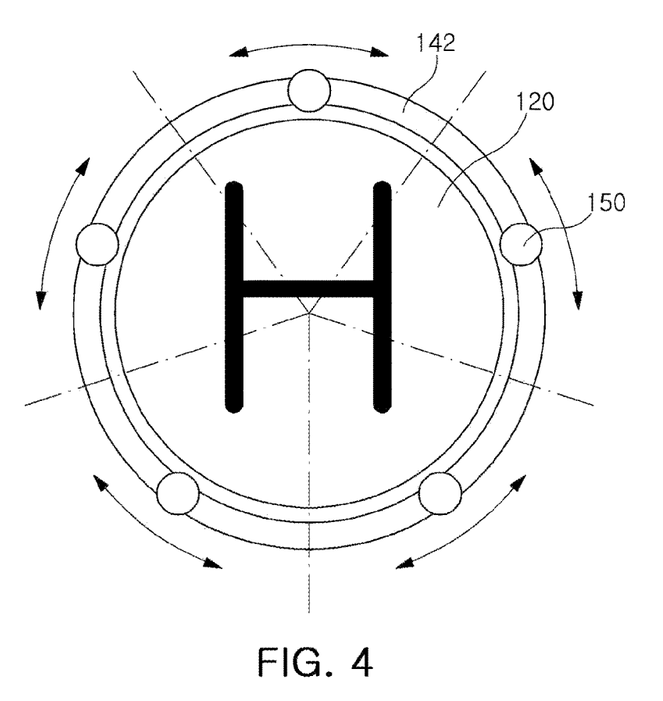
FIG. 4 illustrates a take-off and landing portion, a rail portion, and a power generating unit of a vertiport according to an embodiment of the present disclosure.

FIG. 3 illustrates the take-off and landing portion 120, the rail portion 142, and the power generating unit 150 of the vertiport 100 according to an embodiment of the present disclosure. FIG. 4 illustrates the take-off and landing portion 120, the rail portion 142, and the power generating unit 150 of the vertiport 100 according to another embodiment of the present disclosure.

FIGS. 3 and 4 are diagrams illustrating various examples in which sections in which each of the plurality of power generating units 150 moves on the rail portion 142 are divided depending on the number of power generating units 150, and the number of power generating units 150 is not limited to the embodiments illustrated in FIGS. 3 and 4.

For example, FIGS. 3 and 4 illustrate an arrangement relationship of the take-off and landing portion 120, the rail portion 142, and the power generating unit 150 when the vertiport 100 illustrated in FIGS. 1 and 2 is viewed from above. In the drawing, the body portion 110, the door portion 130, the guide portion 141, and the controller 160 may be omitted.

Referring to FIGS. 3 and 4, the power generating unit 150 may be provided in plural numbers, and each of the plurality of power generating units 150 may move in a designated section by dividing the circular rail portion 142 at the same angle.

When n power generating units 150 are provided, each power generating unit 150 may be assigned a movement section (or movement region) obtained by dividing 360° by n. Accordingly, each power generating unit 150 may move in different sections of the rail portion 142, but the lengths of the sections in which respective power generating units 150 move may be equal.

As an example, as illustrated in FIG. 3, when there are four power generating units 150, a movement region of about 90° may be allocated to each power generating unit 150. The four power generating units 150 may move in four sections of the rail portion 142 divided by about 90°, respectively.

For example, a first power generating unit may move in a first section of the rail portion 142 corresponding to about 0° to 90°, a second power generating unit may move in a second section of the rail portion 142 corresponding to about 90° to 180°, a third power generating unit may move in a third section of the rail portion 142 corresponding to about 180° to 270°, and a fourth power generating unit may move in a fourth section of the rail portion 142 corresponding to about 270° to 360°.

As another example, as illustrated in FIG. 4, when five power generating units 150 are provided, a movement region of about 72° may be allocated to each power generating unit 150. The five power generating units 150 may each move in five sections of the rail portion 142 divided by about 72 degrees.

For example, the first power generating unit may move in a first section of the rail portion 142 corresponding to about 0° to about 72°, the second power generating unit may move in a second section of the rail portion 142 corresponding to about 72° to about 144°, the third power generating unit may move in a third section of the rail portion 142 corresponding to about 144° to about 216°, the fourth power generating unit may move in a fourth section of the rail portion 142 corresponding to about 216° to about 288°, and the fifth power generating unit may move in a fifth section of the rail portion 142 corresponding to about 288° to about 360°.

Figure 5:
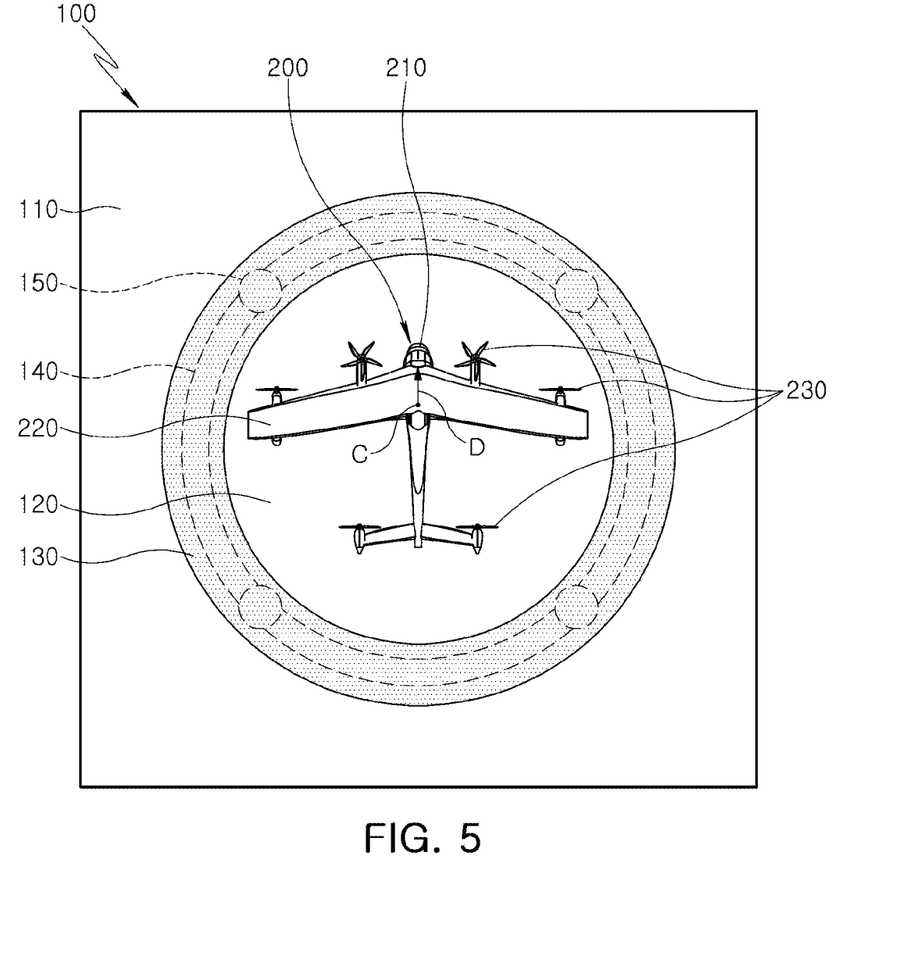
FIG. 5 illustrates a vertiport and an aircraft taking off from and landing on the vertiport according to another embodiment of the present disclosure.

FIG. 5 illustrates the vertiport 100 and the aircraft 200 taking off and landing on the vertiport 100 according to an embodiment of the present disclosure.

FIG. 5 is a diagram illustrating the arrangement relationship between the components of the vertiport 100 and the aircraft 200 when the aircraft 200 lands on the vertiport 100.

The vertiport 100 in FIG. 5 is illustrated as a plan view of the vertiport 100 in the default mode (e.g., with the door portion 130 closed) illustrated in FIG. 1, viewed in a direction in which the aircraft 200 lands.

Referring to FIG. 5, the vertiport 100 according to an embodiment may include the body portion 110, the take-off and landing portion 120, the door portion 130, the elevation portion 140, and the power generating unit 150, and the elevation portion 140 illustrated in FIG. 5 may be a rail portion (e.g., the rail portion 142 of FIGS. 1 to 3).

The description of the above components may be the same as that given above with reference to FIGS. 1 to 3, and redundant descriptions will be omitted below.

The aircraft 200 taking off or landing on the vertiport 100 may include a fuselage 210, wings 220, and rotors 230. For example, the fuselage 210 may be provided to allow boarding of passengers and/or loading of cargo, the wings 220 may be coupled to an upper portion of the fuselage 210, and the rotor 230 may be configured to generate lift and may be coupled to the wings 220. The wings 220 may include a main wing and a tail wing, and the rotors 230 may be coupled to the main wing and the tail wing, respectively. The positions of the rotors 230 may vary depending on the aircraft 200.

Meanwhile, the aircraft 200 illustrated in FIG. 5 is an example. That is, the shape of the aircraft 200 that takes off and lands on the vertiport 100 of embodiments of the present disclosure is not particularly limited, and aircraft of various shapes capable of vertical take-off and landing may take-off and land on the vertiport 100.

In order to increase the efficiency of the power generating unit 150, the vertiport 100 according to an embodiment may be configured to adjust the position of the power generating unit 150 based on the aircraft information and status information of the aircraft 200 which may land on the vertiport 100.

Here, the aircraft information of the aircraft 200 relates to the model of the aircraft 200 and may include the position of the rotor 230 for each model. In addition, the status information of the aircraft 200 relates to the state in which the aircraft 200 may land and may include a landing position of the aircraft 200 and a direction in which the aircraft 200 is heading. The landing position of the aircraft 200 may be detected or calculated through a relative position difference between a reference point of the aircraft 200 and a reference point of the take-off and landing portion 120.

As such, the vertiport 100 according to an embodiment may calculate the position of the power generating unit 150 at which the maximum efficiency may be obtained by comprehensively considering a position in which the aircraft 200 is to land on the take-off and landing portion 120 and a direction in which the aircraft 200 is heading, together with the positions of the rotors 230 of the aircraft 200, and may move the power generating unit 150 to the corresponding position.

As for the movement of the power generating unit 150, the plurality of power generating units 150 may be moved within allocated sections, respectively, as described above with reference to FIGS. 3 and 4. For example, referring back to FIG. 3, when the maximum efficiency positions of the power generating units 150 are calculated based on the landing position, landing direction, and rotor position of the aircraft 200, the four power generating units 150 may move independently within the allocated sections and may be arranged in the calculated positions, respectively.

Figure 6:
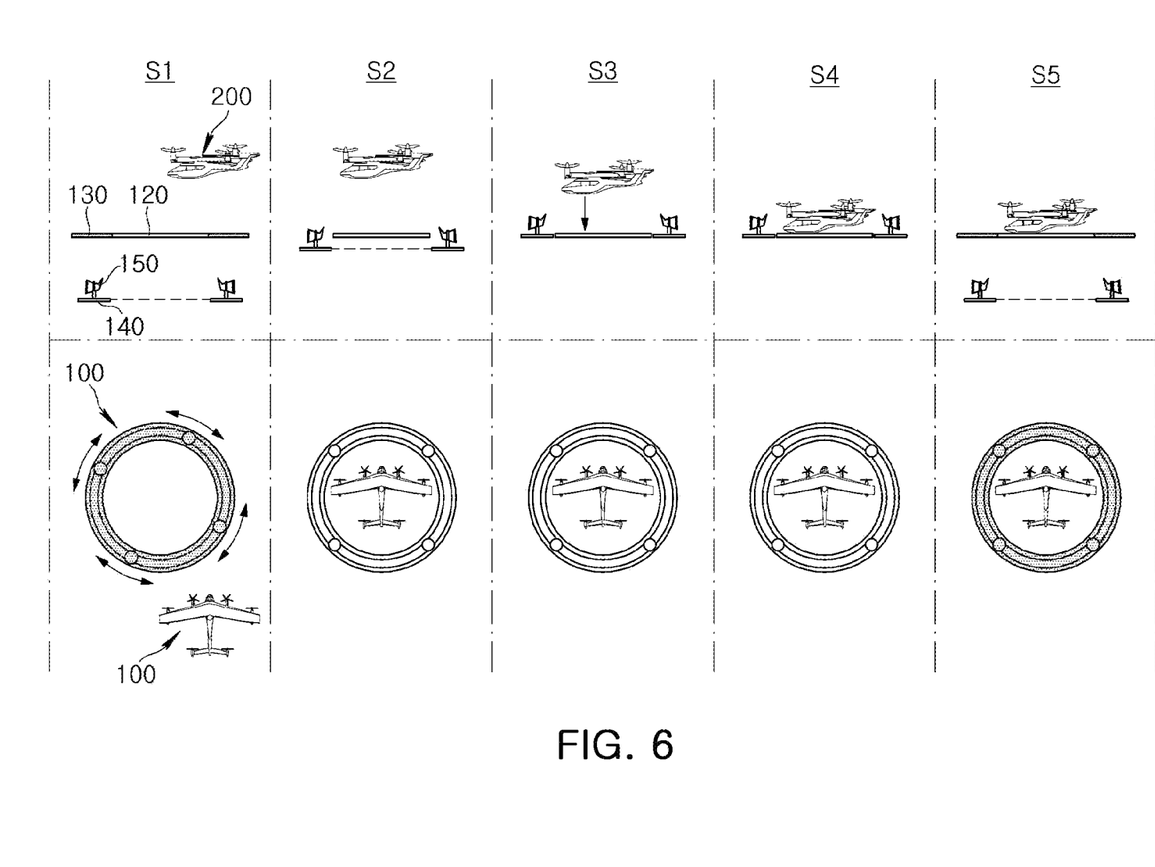
FIG. 6 illustrates an aircraft landing operation on a vertiport according to an embodiment of the present disclosure.

FIG. 6 illustrates an operation of the aircraft 200 landing on the vertiport 100 according to an embodiment of the present disclosure.

FIG. 6 illustrates how the aircraft 200 lands on the vertiport 100 described above with reference to FIGS. 1 to 5 and how electrical energy is produced through the power generating unit 150 during the landing process of the aircraft 200. As such, hereinafter, in describing FIG. 6, FIGS. 1 to 5 will be referred to together, and redundant descriptions will be omitted hereinafter.

The upper side in FIG. 6 is a side view of each operation, and the lower side is a top view corresponding to the upper side view.

Referring to FIG. 6, a method of landing the aircraft 200 on the vertiport 100 according to an embodiment includes an operation S1 in which the aircraft 200 approaches, an operation S2 in which the door portion 130 is opened and the elevation portion 140 is raised, an operation S3 in which the aircraft 200 descends and power is generated using the power generating unit 150, an operation S4 in which the aircraft 200 lands and settles in the take-off and landing portion 120, and an operation S5 in which the elevation portion 140 is lowered and the door portion 130 is closed.

In the operation S1 in which the aircraft approaches, the aircraft 200 may approach the vertiport 100 to land on the vertiport 100. In operation S1, the vertiport 100 may be in the default mode illustrated in FIG. 1.

In operation S1, the aircraft 200 may transmit aircraft information and status information of the aircraft 200 to the vertical take-off and landing portion 120, the controller 160 of the vertical take-off and landing portion 120 may calculate an operating position of the power generating unit 150 based on the aircraft information (e.g., including the position of the rotor 230 according to the model of the aircraft 200) and status information (e.g., including the landing position of the aircraft 200 and the direction in which the aircraft 200 is heading) and move the power generating unit 150 to the operating position. Here, the operating position refers to a position of the power generating unit 150 at which the power generating unit 150 may produce electricity with maximum efficiency in response to the landing position, landing direction, and rotor position of the aircraft 200 to land.

For example, the controller 160 may calculate a relative position of the rotor 230 with respect to the take-off and landing portion 120, the rail portion 142, and the power generating unit 150 based on the landing position and the landing direction of the aircraft 200 and the rotor position according to the model of the aircraft 200 and may calculate and determine the position of the power generating unit 150 at which electricity may be produced with the maximum efficiency in response to the calculated relative position of the rotor 230.

In the operation S2 in which the door portion 130 is opened and the elevation portion 140 is raised, the aircraft 200 is hovering above the vertiport 100, the vertical take-off and landing portion 120 may open the door portion 130, and the rail portion 142 may be raised.

In operation S2, the aircraft 200 performs a maintenance flight above the take-off and landing portion 120 in the landing position and landing direction corresponding to the status information provided in operation S1, and the controller 160 may open the door portion 130 and raise the rail portion 142 of the elevation portion 140 to switch to the power generation mode (e.g., the state of the vertical take-off and landing portion 120 illustrated in FIG. 2).

For example, as the door portion 130 is opened and the rail portion 142 is raised, the power generating unit 150 may move to the outside of the body portion 110 and may be exposed through the gap G between the take-off and landing portion 120 and the body portion 110.

In the operation S3 in which the aircraft 200 descends and power is generated using the power generating unit 150, the power generating unit 150 and the rail portion 142 are completely raised, and the aircraft 200 may descend toward the take-off and landing portion 120 for landing. In operation S3, the vertiport 100 may be switched to the power generation mode illustrated in FIG. 2. At this time, the power generating unit 150 may be disposed in the operating position designated in operation S1.

In the operation S3, the power generating unit 150 may produce electrical energy by generating wind power using the downdraft generated as the aircraft 200 descends. The electricity produced by the power generating unit 150 may be supplied to a demand source provided in the vertiport 100.

In the operation S4 in which the aircraft lands and reaches the take-off and landing portion 120, the aircraft 200 may reach the take-off and landing portion 120 and completely land.

In the operation S4, the aircraft 200 may transmit a landing completion signal to the controller 160 of the vertical take-off and landing portion 120, and, upon receiving the landing completion signal, the controller 160 may lower the elevation portion 140 and prepare to close the door portion 130.

In the operation S5, the controller 160 may close the door portion 130 after the power generating unit 150 and the rail portion 142 are completely lowered. When closing of the door portion 130 is completed, the controller 160 may transmit a get-off permission signal of a passenger and/or cargo to the aircraft 200.

Meanwhile, in the above operations, the aircraft 200 may communicate with a control system provided inside and/or outside the vertiport 100 and generally controlling the route of the aircraft 200 and the take-off and landing of the aircraft 200, and it may transmit and receive various types of information and signals related to take-off and landing of the aircraft 200 through the control system. According to various embodiments, the control system may be included in the controller 160 of the vertiport 100 or it may include the controller 160.

According to an embodiment of the present disclosure, it is possible to recycle energy and build an eco-friendly vertiport system by including a wind power generating unit capable of producing electricity using a downdraft generated during take-off and landing of an aircraft.

While example embodiments have been illustrated and described above, it will be apparent to those skilled in the art that modifications and variations could be made without departing from the scope of the present disclosure as defined by the appended claims.

What is claimed is:

1. A vertiport comprising:
   a body portion;
   a predetermined gap;
   a take-off and landing portion disposed in the body portion and spaced apart from the body portion by the gap;
   a door portion disposed at the gap between the take-off and landing portion and the body portion and configured to open and close the gap;
   an elevation portion disposed in the body portion and configured to be raised and lowered with respect to the body portion; and
   a power generating unit slidably coupled to the elevation portion,
   wherein the power generating unit is configured to produce electrical energy using a downdraft generated by a take-off and landing operation of an aircraft on the take-off and landing portion, and
   wherein the elevation portion comprises a rail portion along which the power generating unit is configured to slide horizontally and a guide portion configured to guide a vertical movement of the rail portion.

2. The vertiport of claim 1, wherein:
the vertiport is configured to be switched between a default mode and a power generation mode;
in the default mode, the door portion is in a closed state, the elevation portion is in a lowered state, and the power generating unit is located below the body portion; and
in the power generation mode, the door portion is in an opened state, the elevation portion is in a raised state, and the power generating unit is exposed between the body portion and the take-off and landing portion.

3. The vertiport of claim 2, wherein the power generating unit is configured to produce the electrical energy based on the take-off and landing operation of the aircraft in the power generation mode.

4. The vertiport of claim 1, wherein:
the rail portion comprises a rail configured to guide sliding of the power generating unit; and
the power generating unit is configured to slide along a section of the rail portion along the rail.

5. The vertiport of claim 1, wherein:
the power generating unit comprises a plurality of power generating units; and
the rail portion comprises a plurality of movement sections, a number of the plurality of movement sections corresponding to a number of the plurality of power generating units.

6. The vertiport of claim 5, wherein:
the rail portion has a circular shape;
each power generating unit of the plurality of power generating units is assigned to a corresponding one of the movement sections of the plurality of movement sections; and
each of the movement sections of the plurality of movement sections has an angle range determined by dividing 360 degrees by the number of the power generating units.

7. The vertiport of claim 1, wherein the power generating unit comprises a wind turbine.

8. The vertiport of claim 1, further comprising a controller configured to control an opening and closing operation of the door portion, an elevation operation of the rail portion, and a sliding operation of the power generating unit.

9. The vertiport of claim 8, wherein the controller is configured to:
determine an operating position of the power generating unit based on aircraft information and status information of the aircraft performing the take-off and landing operation on the take-off and landing portion; and
move the power generating unit to the operating position.

10. The vertiport of claim 9, wherein:
the aircraft information comprises a model of the aircraft and a rotor position of a rotor of the aircraft according to the model; and
the status information comprises a landing position of the aircraft with respect to the take-off and landing portion and a landing direction of the aircraft.

11. The vertiport of claim 10, wherein the controller is configured to:
calculate a relative position of the rotor with respect to the take-off and landing portion or the rail portion based on the landing position, the landing direction, and the rotor position; and
calculate and determine the operating position to correspond to the relative position of the rotor.

12. The vertiport of claim 9, wherein the operating position is a position at which the power generating unit is expected to produce the electrical energy with maximum efficiency.

13. The vertiport of claim 1, wherein the vertiport is configured to use the electrical energy produced by the power generating unit to charge the aircraft.

14. The vertiport of claim 1, wherein the gap entirely surrounds the take-off and landing portion in a top view.

15. The vertiport of claim 1, wherein the take-off and landing portion is circular, and wherein the gap is circular.

16. A method of landing an aircraft at a vertiport equipped with a power generating unit, the method comprising:
determining whether the aircraft approaches the vertiport;
opening a door portion in the vertiport and raising the power generating unit in response to a determination that the aircraft approaches the vertiport;
producing electrical energy by the power generating unit in an operation in which the aircraft descends toward the vertiport, wherein the power generating unit produces the electrical energy using a downdraft generated during the operation in which the aircraft descends toward the vertiport; and
lowering the power generating unit and closing the door portion in response to the aircraft landing on the vertiport and reaching a take-off and landing portion of the vertiport,
wherein the vertiport comprises
a body portion, and
an elevation portion disposed in the body portion and configured to be raised and lowered with respect to the body portion, and
wherein the elevation portion comprises a rail portion along which the power generating unit is configured to slide horizontally and a guide portion configured to guide a vertical movement of the rail portion.

17. The method of claim 16, wherein:
determining whether the aircraft approaches the vertiport comprises determining an operating position of the power generating unit based on aircraft information and status information of the aircraft; and
raising the power generating unit comprises moving the power generating unit to the operating position.

18. The method of claim 17, wherein:
the aircraft information comprises a model of the aircraft and a rotor position of a rotor of the aircraft according to the model;
the status information comprises a landing position of the aircraft with respect to the take-off and landing portion and a landing direction of the aircraft; and
the operating position is a position in which the power generating unit is expected to produce the electrical energy with maximum efficiency.

19. The method of claim 18, wherein determining the operating position of the power generating unit comprises:
calculating a relative position of the rotor with respect to the take-off and landing portion based on the landing position, the landing direction, and the rotor position; and
calculating the operating position to correspond to the relative position of the rotor.

20. A system for obtaining electrical energy from a downdraft of an aircraft, the system comprising:
the aircraft comprising a rotor; and
a vertiport configured to be switched between a default mode and a power generation mode, the vertiport comprising:

a body portion;

a take-off and landing portion disposed in the body portion and spaced apart from the body portion by a predetermined gap;

a door portion disposed in the gap between the take-off and landing portion and the body portion and configured to be opened and closed;

an elevation portion disposed in the body portion and configured to be raised and lowered with respect to the body portion; and a power generating unit slidably coupled to the elevation portion, wherein the power generating unit is configured to produce the electrical energy using the downdraft generated by a take-off and landing operation of the aircraft on the take-off and landing portion, wherein the elevation portion comprises a rail portion along which the power generating unit is configured to slide horizontally and a guide portion configured to guide a vertical movement of the rail portion, wherein, in the default mode, the door portion is in a closed state, the elevation portion is in a lowered state, and the power generating unit is located below the body portion, and wherein in the power generation mode, the door portion is in an opened state, the elevation portion is in a raised state, and the power generating unit is exposed between the body portion and the take-off and landing portion at an operating position determined based on a position of the rotor of the aircraft.

* * * * *